United States Patent [19]

Sizelove et al.

[11] 4,227,836

[45] Oct. 14, 1980

[54] SUSPENSION FOR SILO UNLOADERS

[75] Inventors: Cary L. Sizelove; Donald G. Wells, both of Harvard, Ill.

[73] Assignee: Chromalloy American Corporation, New York, N.Y.

[21] Appl. No.: 37,907

[22] Filed: May 10, 1979

[51] Int. Cl.³ .............................................. B65G 53/50
[52] U.S. Cl. ....................................... 406/114; 414/313
[58] Field of Search ....................... 406/56, 57, 58, 59, 406/79, 80, 114; 414/313-322

[56] References Cited

U.S. PATENT DOCUMENTS

| 1,479,990 | 1/1924 | Keys | 414/313 X |
| 2,963,327 | 12/1960 | Seymour et al. | 406/114 X |
| 3,912,090 | 10/1975 | Pondell | 414/318 X |
| 4,091,940 | 5/1978 | Schmiesing | 406/114 X |

Primary Examiner—James L. Rowland
Attorney, Agent, or Firm—Wegner, Stellman, McCord, Wiles & Wood

[57] ABSTRACT

A top silo unloader is of the type which has a cutter-conveyor pickup arm, an impeller, a drive ring above the cutter-conveyor pickup arm, and support arms in a horizontal plane above the drive ring to which suspension cables are connected for moving the unloader vertically in the silo. Improved support arms have downwardly and outwardly extending offset portions outside the drive ring which have their free ends in a plane above the bottom of the cutter-conveyor pickup arm, and means on the free ends of the offset portions to receive the suspension cables.

5 Claims, 3 Drawing Figures

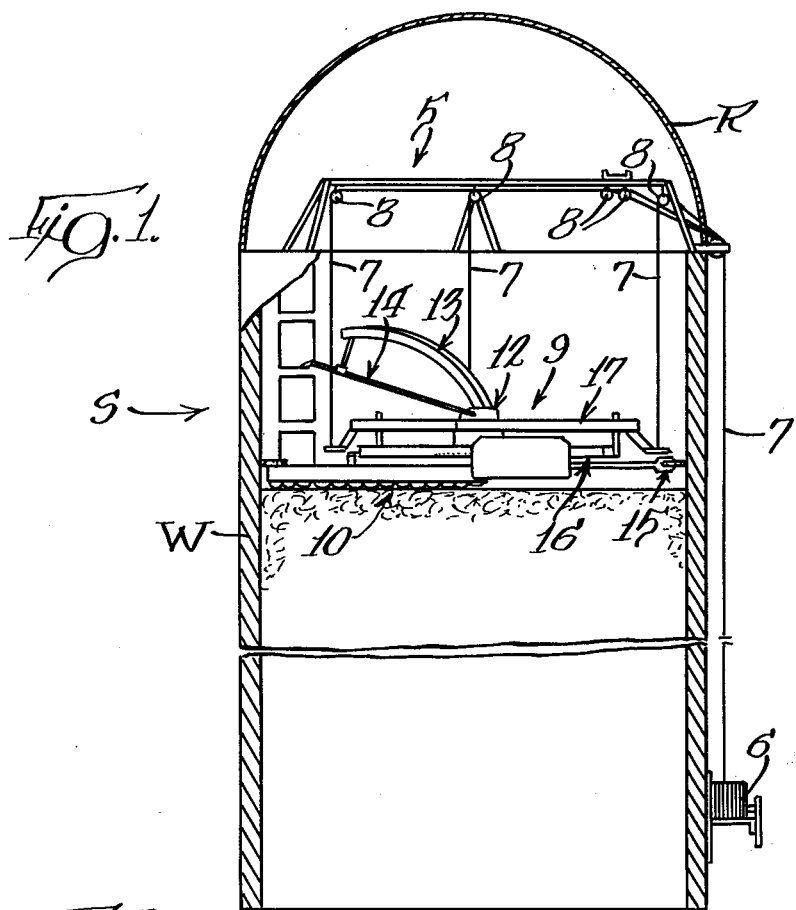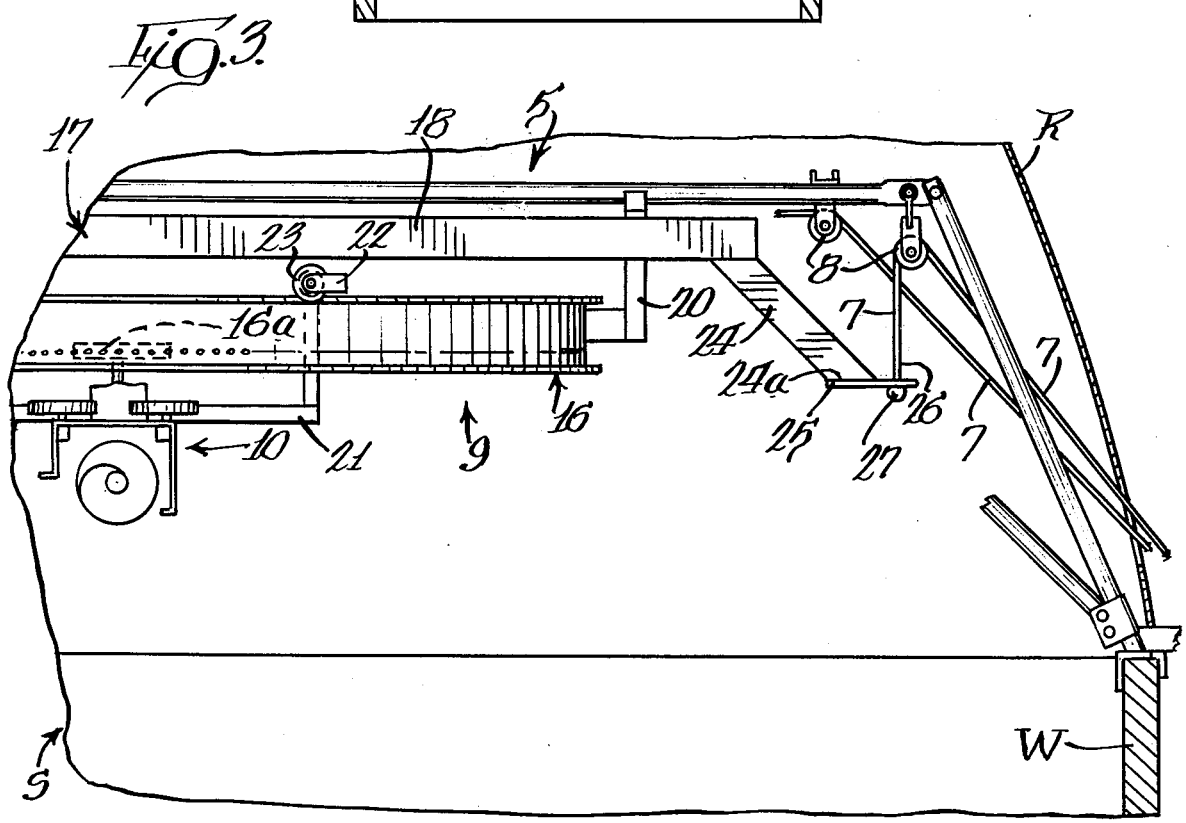

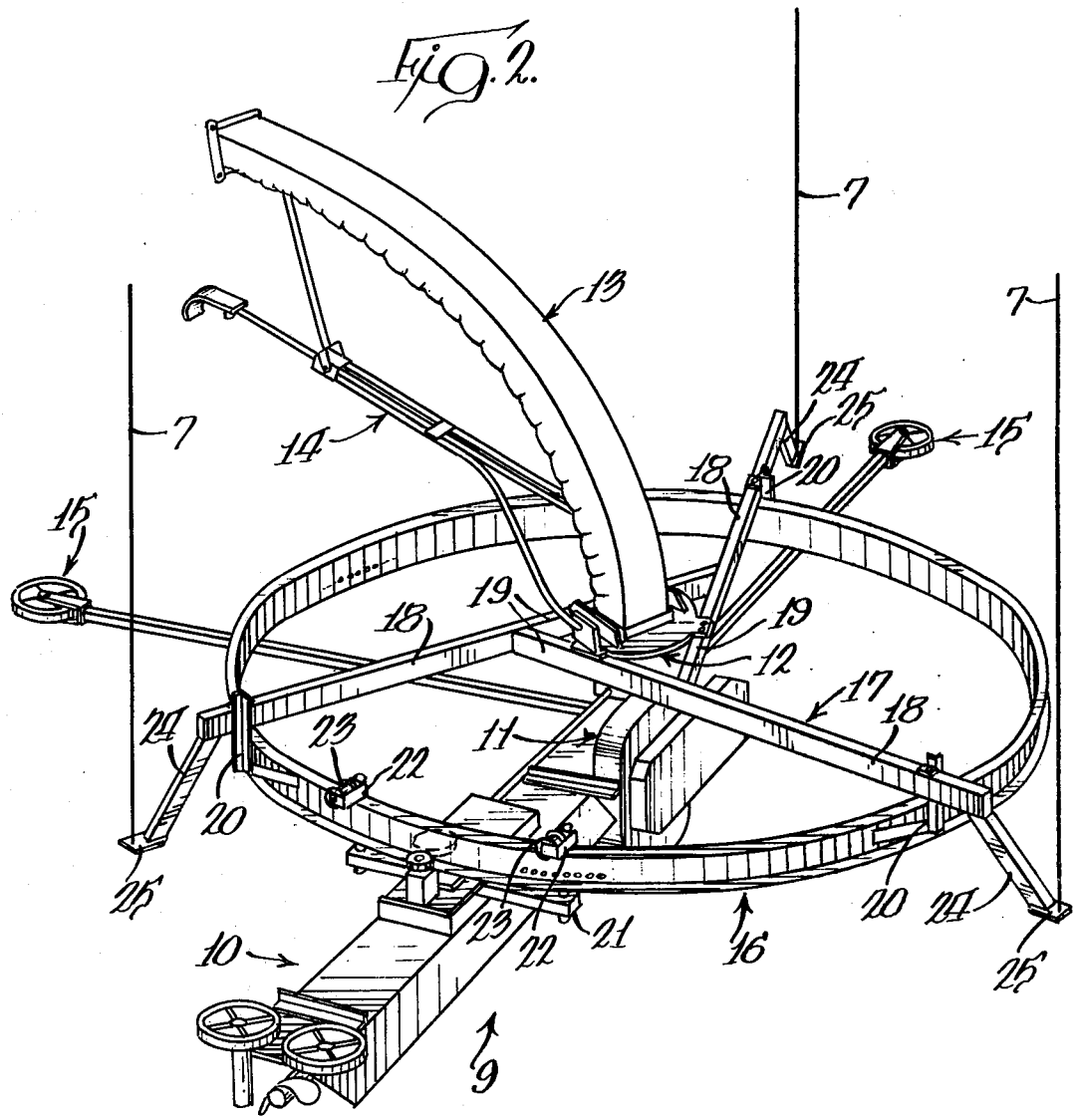

SUSPENSION FOR SILO UNLOADERS

BACKGROUND OF THE INVENTION

Top silo unloaders are suspended from a tripod which is supported upon the top of the silo wall and extends into the domed silo roof. Those silo unloaders which have a drive ring are provided with three horizontal support arms the outer ends of which are outside the perimeter of the drive ring, and suspension cables which are trained over sheaves in the upper part of the tripod are secured to the outer ends of the support arms so that the silo unloader may be moved vertically in the silo by operation of a winch near the base of the silo.

When a silo is to be filled, the unloader must be raised high enough to avoid or minimize interference with the incoming material.

If the silo unloader is too low some of the incoming material will drop onto the cutter-conveyor pickup arm and other components. This results in severe overloading of the supporting tripod and can cause damage to or collapse of the tripod. In addition, these lower silo unloader components will intercept or deflect the incoming silage stream and thus prevent the desired even and symmetrical placement of material across the entire area of the silo.

The silo unloader discharge chute may be removed; but even so the vertical height of the unloader and the span across the support arms usually prevents raising the unloader high enough to prevent the pickup arm from interfering seriously with the incoming material.

SUMMARY OF THE INVENTION

In accordance with the present invention, the support arms have downwardly and outwardly extending offset portions outside the drive ring, and the free ends of the offset portions are in a plane above the bottom of the pickup arm. This permits the horizontal support arms to be raised to a position in or above the top of the tripod, level with or above the sheaves over which the suspension cables are trained. In this position the pickup arm, which is the lowermost part of the silo unloader, is high enough above the silo wall that during filling the silage distribution device throws the silage completely underneath it.

THE DRAWINGS

FIG. 1 is fragmentary sectonal view of a partialy filled silo with a silo unloader embodying the preferred form of the invention suspended therein;

FIG. 2 is a perspective view of the silo unloader of the invention; and

FIG. 3 is a fragmentary sectional view on an enlarged scale, illustrating the silo unloader in its fully raised position, viewed from the end of the cutter-conveyor pickup arm, with part broken away.

DETAILED DESCRIPTION OF THE INVENTION

Referring to FIG. 1, a silo, indicated generally at S, has a wall W which usually is surmounted by a hemispherical roof R. Surmounting the wall W is a tripod, indicated generally at 5; and a winch 6 on the exterior of the wall W near the base of the silo S controls a system of suspension cables 7 which are trained over sheaves 8 hung from the upper part of the tripod 5. A silo unloader, indicated generally at 9, is hung from the suspension cables 7 so that it may be moved vertically in the silo S, by operation of the winch 6, between an unloading position as illustrated in FIG. 1 and a raised position illustrated in FIG. 3 in which it is as close as possible to the top of the tripod 5.

The silo unloader 9 is of a well known type which includes a cutter-conveyor pickup arm, indicated generally at 10; an impeller, indicated generally at 11; a collector ring, indicated generally at 12; a discharge chute, indicated generally at 13; a torque arm, indicated generally at 14; and pressure and guide wheels, indicated generally at 15.

A drive ring, indicated generally at 16, is fastened beneath an assembly of support arms, indicated generally at 17; and the drive ring is concentric with the collector ring 12 and has one side overlying the cutter-conveyor pickup arm 10.

The support arm assembly 17 consists of three effectively horizontal arms 18 the inner end portions 19 of which define an equilateral triangle surrounding the collector ring 12 and secured to the collector ring casing. The inner ends of the support arms 18 are fixedly secured to one another to provide a very rigid assembly. Brackets 20 near the outer ends of the support arms 18 provide support for the drive ring 16, and a trolley bracket 21 on the cutter-conveyor pickup arm 10 carries overhanging brackets 22 with rollers 23 by means of which the weight of the pickup arm 10 is suspended from the drive ring 16. The drive is by a toothed wheel 16a.

The structure as described up to this point is all prior art; and the present invention resides in the construction of the support arms 18 which is about to be described.

Each of the support arms 18, outside the drive ring 16, has a downwardly and outwardly extending offset portion 24 which preferably is inclined; and as seen in FIG. 3 said offset portions have their free ends 24a in a plane above the bottom of the pickup arm 10. In the preferred embodiment illustrated in the drawings the offset portions 24 are immovably fixed to the arms 18, so their free ends must be in a plane slightly above the top of the pickup arm 10 so as not to interfere with its rotation.

At the outer end of each of the offset portions 24 is fixed means in the form of a plate 25 for securement of one of the suspension cables 7, each of which, as seen in FIG. 3, is connected to a plate 25 by having a lower end portion 26 extending through a hole in the plate 25 and provided with a fixed securing lug 27.

The offset portions 24 of the support arms 18 are seen in FIG. 3 to permit the silo unloader 9 to be raised by the system of suspension cables 7 to a level at which the horizontal support arms 18 are in or above the top of the tripod 5. This places the pickup arm 10 high enough above the wall W that silage scattered about the silo by a conventional filler pipe and fixed deflector generally passes entirely beneath the unloader.

In the illustrated embodiment the top of the tripod structure 5 limits the height to which the support arms 18 may be raised. However, some silo unloaders to which the present invention is applicable have a tripod with a large enough central opening that the support arms 18 may be above the tripod. In such structures the unloader may be raised until the plates 25 touch the sheaves 8.

In prior art silo unloaders, the support arms corresponding to the arms 18 extended far enough laterally in a single plane that the cables 7 could be fastened directly to the support arms 18 outside the drive ring. Inspection of FIG. 3 makes it apparent that in such a construction when the unloader was raised as far as possible the pickup arm 10 was approximately at the level of the top of the silo wall W. Since the filler pipe and deflector for loading the silo are mounted above the top of the wall W, the difference in height between the prior art structure and that of the present invention is very significant when the silo is being filled.

The foregoing detailed description has been given for clearness of understanding only and no unnecessary limitations should be understood therefrom as modifications will be obvious to those skilled in the art.

We claim:

1. In a silo unloader of the type which includes a cutter-conveyor pickup arm, an impeller to receive silage from the pickup arm and discharge it from the silo, a drive ring generally concentric with the impeller, one side of said drive ring overlying the pickup arm, a plurality of effectively horizontal support arms which have inner end portions secured above the impeller and outer end portions overlying the drive ring and secured thereto, a supporting framework in the top of the silo, suspension cables trained over sheaves at the top of the supporting framework and secured to the extremities of the support arms, and means for extending and retracting the suspension cables to move the silo unloader vertically, the improvement comprising:

said support arms have downwardly and outwardly extending offset portions outside the drive ring which have their free ends in a plane above the bottom of the cutter-conveyor, and the free ends of said offset portions are constructed and arranged for securement of the suspension cables, whereby the silo unloader may be raised to a position in which the effectively horizontal support arms are effectively at or above the horizontal plane of the sheaves and the pickup arm is substantially higher than the top of the silo wall.

2. The improvement of claim 1 in which the supporting framework is a tripod, and there are three support arms.

3. The improvement of claim 1 which includes substantially horizontal plates at the free ends of the support arms with holes for securement of the cables.

4. The improvement of claim 1 in which the offset portions of the support arms are inclined from the support arms to their free ends.

5. The improvement of claim 1 in which the offset portions of the support arms are immovably fixed to said support arms, and the free ends of said offset portions are in a plane slightly above the top of the pickup arm.

* * * * *